United States Patent [19]

Romanovsky et al.

[11] Patent Number: 5,664,088
[45] Date of Patent: Sep. 2, 1997

[54] METHOD FOR DEADLOCK RECOVERY USING CONSISTENT GLOBAL CHECKPOINTS

[75] Inventors: Alexander Borisovitch Romanovsky, St. Petersburg, Russian Federation; Yi-Min Wang, Berkeley Heights, N.J.

[73] Assignee: Lucent Technologies Inc., Murray Hill, N.J.

[21] Appl. No.: 565,038

[22] Filed: Nov. 30, 1995

Related U.S. Application Data

[63] Continuation-in-part of Ser. No. 526,737, Sep. 12, 1995.
[51] Int. Cl.$^6$ .................................................. G06F 11/16
[52] U.S. Cl. ........................... 395/182.11; 395/182.13
[58] Field of Search ....................... 395/182.13, 182.11, 395/182.15, 183.01, 183.1

[56] References Cited

U.S. PATENT DOCUMENTS

| | | | |
|---|---|---|---|
| 4,665,520 | 5/1987 | Strom et al. | 395/182.13 |
| 4,697,266 | 9/1987 | Finley | 395/182.14 |
| 4,740,969 | 4/1988 | Fremont | 395/182.13 |
| 4,852,092 | 7/1989 | Makita | 395/182.15 |
| 5,204,960 | 4/1993 | Smiths et al. | 395/700 |
| 5,235,700 | 8/1993 | Alaiwan et al. | 395/182.11 |
| 5,293,613 | 3/1994 | Hayden et al. | 395/182.13 |
| 5,440,726 | 8/1995 | Fuchs et al. | 395/182.18 |
| 5,481,694 | 1/1996 | Chao et al. | 395/439 |
| 5,528,750 | 6/1996 | Lubant et al. | 395/182.13 |
| 5,530,802 | 6/1996 | Fuchs et al. | 395/182.15 |

OTHER PUBLICATIONS

Y. M. Wang, "Maximum and Minimum Consistent Global Checkpoints and Their Applications", *Proceedings of IEEE the 14th Symposium on Reliable Distributed Systems*, pp. 86–95, Sep. 1995.
A. S. Tanenbaum, *Modern Operating Systems* Englewood Cliffs, NJ; Prentice Hall, pp. 240–252, 1992.
E. Knapp, "Deadlock Detection in Distributed Databases", *ACM Computing Surveys*, vol. 19, No. 4, Dec. 1987.
Y. M. Wang, Y. Huang, W. K. Fuchs, "Progressive Retry for Software Error Recovery in Distributed Systems", *Proc. IEEE Fault-Tolerant Computing Symp.*, 1993, pp. 138–144.

*Primary Examiner*—Robert W. Beausoliel, Jr.
*Assistant Examiner*—Ly V. Hua
*Attorney, Agent, or Firm*—Jeffrey M. Weinick

[57] ABSTRACT

A method for deadlock recovery in a shared resource multiprocess message passing computer system. The processes executing in the computer system perform periodic local checkpoints and communicate via inter-process messages. Upon detection of a deadlock in the computer system, inter-process rollback dependency is analyzed in order to choose a resource to reclaim. The choice of a resource to reclaim is made such that a resource manager which manages the resource can be rolled back so as to reclaim the resource, and such that an application process which is waiting for the resource is not rolled back past the point at which deadlock was detected. Thus, upon system restart, the reclaimed resource can be provided to the waiting process, and the waiting process can execute past the deadlock point. In one embodiment, the recovery line is determined by selecting appropriate checkpoints from a resource manager process and an application process, and determining the most recent consistent global checkpoint which contains the selected checkpoints.

15 Claims, 2 Drawing Sheets

FIG. 1
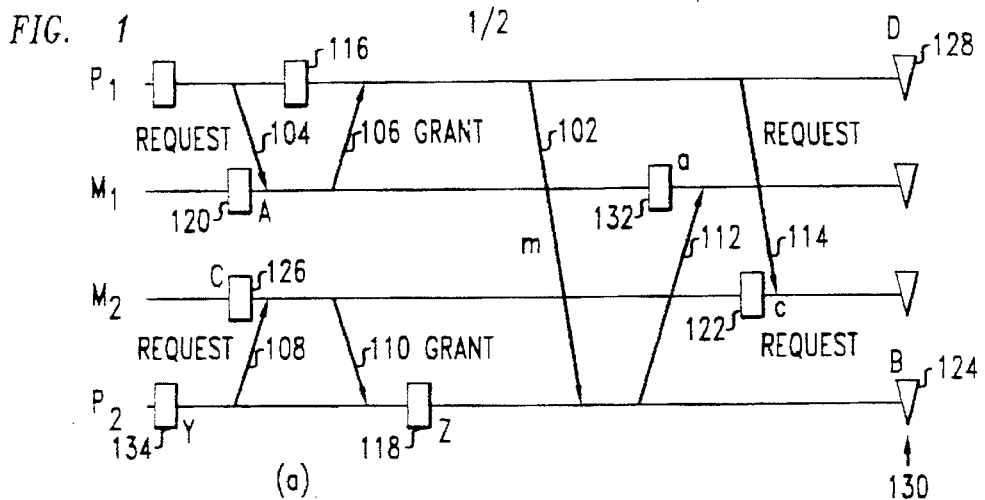
(a)
FIG. 2
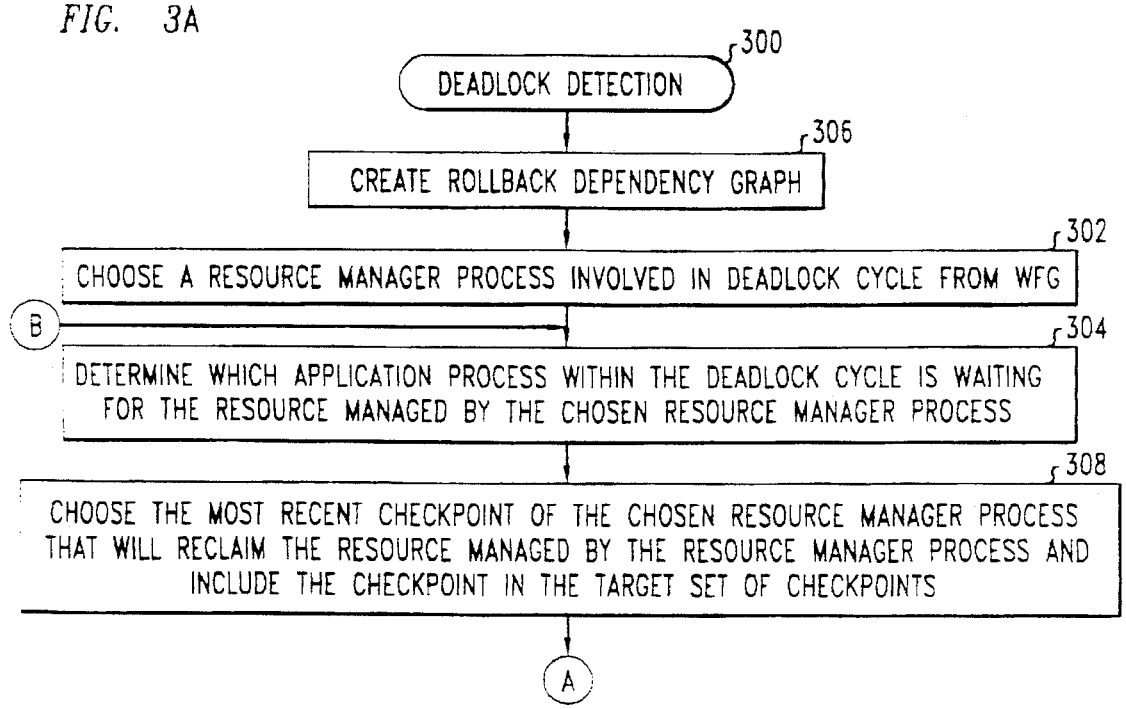
FIG. 3A

METHOD FOR DEADLOCK RECOVERY USING CONSISTENT GLOBAL CHECKPOINTS

This application is a continuation-in-part of copending U.S. patent application Ser. No. 08/526,737 (attorney docket no. Wang 6), filed Sep. 12, 1995, entitled Method for Software Error Recovery Using Consistent Global Checkpoints, which is incorporated herein by reference.

FIELD OF THE INVENTION

The present invention relates generally to computer system deadlock recovery. More particularly, the present invention relates to improved deadlock recovery in multiprocess message passing computer systems.

BACKGROUND OF THE INVENTION

A multiprocessing computer system has multiple processes executing on the system. Each process performs a particular task, and the processes, taken as a whole, perform some larger task, called an application. These processes may be executing on a single central computer or they may be running on separate computers which are connected to each other via some type of communication link, i.e. a distributed computer system. As used herein, the term computer includes any device or machine capable of accepting data, applying prescribed processes to the data, and supplying the results of the processes.

In order for the application task to function correctly, the separate processes must coordinate their functions. This coordination is often accomplished through inter-process communication. A system in which inter-process communication is accomplished by processes sending messages to, and receiving messages from, other processes, is called a message passing system.

If a failure occurs in one of the processes, often the entire application must be reinitialized, because each of the processes is dependent on the successful operation of the other processes. In such a case, each of the processes must be rolled back to the beginning of execution. Such reinitialization is very costly, because all the work performed by the application up until the failure is lost. The cost of restarting a computer system in the event of a process failure is reduced by the technique of checkpointing.

Generally, a checkpoint is a snapshot of the state of a process which is saved on non-volatile storage, and which survives process failure. Upon recovery, the checkpoint can be reloaded into volatile memory, and the process can resume execution from the checkpointed state. Checkpointing reduces the amount of lost work in the event of a process failure because the checkpointed processes only need to be rolled back to the last checkpoint. When the processes in a system are rolled back to previous checkpoints, the set of checkpoints to which the processes are rolled back is called the recovery line.

In message passing systems, process rollback is complicated by the need to maintain a consistent state of the system. In a message passing system, the rollback of one process may require the rollbacks of other processes in order to guarantee consistency, of the state of the system as a whole. For example, if the sender of a message m rolls back to a checkpointed state before message m was sent (i.e. unsends m), then the receiver of m must also roll back to a checkpointed state before m was received (i.e. unreceive m). If such rollback procedure is not followed, the states of the two processes together will show that message m has been received but not yet sent, which is inconsistent. The rolling back of multiple processes based on an initial rollback of one process, in order to maintain a consistent system state, is called rollback propagation.

It is noted that in some systems, if a process is rolled back to a checkpointed state before message m is received, it may not be necessary to roll back the sender to a checkpointed state before the message was sent. This is because the receiver may log the message when received. Upon rollback to a checkpointed state prior to receipt of the message, the message remains in the receiver's message log and may be processed upon resumption of execution.

In a system with N processes, a global checkpoint is a set of N checkpoints, one from each process. A consistent global checkpoint is a global checkpoint which results in a consistent system state. It is noted that a system may have more than one consistent global checkpoint.

In multiprocessing systems, resources are often shared among the executing processes. Such resources may include, for example, disk drives, printers, shared memory, and databases. During processing, a process may require exclusive access to a resource, such that another process may not use that resource until the first process is finished with it. Such mutually exclusive sharing of resources may be accomplished by using a resource manager process. Such a resource manager process receives requests for access to a resource from processes, grants exclusive access to the resource to the requesting process if the resource is available, and denies other processes' requests for that resource until the process which was granted access releases the resource.

A problem with mutually exclusive access to resources is the possibility that the computer system will enter a deadlock state. A deadlock state is a state in the computer system in which, because of a resource allocation pattern, the computer system cannot progress past a processing point. For example, consider a computer system with two resources R1 and R2, and two processes P1 and P2, where P1 and P2 both need simultaneous exclusive access to R1 and R2 at some point in order to successfully complete their processing. If P1 gains exclusive access to R1 and R2, then P2 must wait until P1 releases the resources. Such a situation does not present a problem, because it is presumed that P1 will eventually releases the resources, at which time P2 may gain access to the resources. However, consider the situation in which P1 gains access to R1 and P2 gains access to R2. If this occurs, then P1 cannot finish its task until it gains access to R2, and P2 cannot finish its task until it gains access to R1. However, P1 will not release R1 until it gains access to R2, and P2 will not release R2 until it gains access to R1. At this point, the system is in a deadlock state.

When deadlock is detected, one of the processes involved in the deadlock is generally terminated, so that it releases the resource it held, and the resource can be reclaimed by the system. The terminated process is called the victim. The reclaimed resource may then be used by a waiting process. If the waiting process can finish processing using the reclaimed resource, then the system can progress past the deadlock state. Victim selection is generally made on a random basis, or based on a static priority assigned to the processes.

However, the above deadlock recovery mechanism is not sufficient in a multiprocess message passing system because rollback propagation due to message dependencies may force non-terminated processes 16 rollback, resulting in the same deadlock cycle reappearing. For example, in the above example, if P1 is terminated in order to reclaim resource R1 for P2, the termination may require that P2 be rolled back to an execution point before it requested R1. In such a situation, when P1 and P2 resume execution, they may end up in the same deadlock state.

SUMMARY OF THE INVENTION

In a multiprocess shared resource computer system in which processes communicate via inter-process communications and in which processes perform periodic local checkpoints, a method for deadlock recovery which increases the likelihood that at least one process involved in a deadlock cycle can execute beyond the point of deadlock such that the same deadlock cycle will not reappear.

In accordance with the principles of the present invention, upon the detection of a deadlock state in the computer system, the inter-process rollback dependency of the system is analyzed. A resource which is involved in the deadlock is chosen to reclaim, with such choice based on the inter-process rollback dependency analysis. Upon reclamation of the chosen resource, the resource may be provided to a waiting process which is not rolled back past the deadlock point. Such a recovery method breaks the deadlock cycle and allows the system to progress past the deadlock state.

In accordance with one embodiment of the invention, upon detection of a deadlock state, a checkpoint of a resource manager process which manages a resource involved in the deadlock is identified. Such identified checkpoint is one which, if rolled back to, would result in the system reclaiming the resource managed by the resource manager process. In addition, a volatile checkpoint of an application process waiting for the resource managed by the resource manager process is identified. The volatile checkpoint is a checkpoint stored in volatile memory which contains the application process's state at the time of deadlock detection. A consistent global checkpoint, which includes the identified checkpoints, is determined, and the system is rolled back to the recovery line identified by such consistent global checkpoint. Such a rollback allows the resource to be reclaimed without rolling back the application process past the point where the deadlock occurred. Thus, when the system is restarted the resource will be available and the application process will still have an outstanding request for the resource. Thus, the resource can be provided to the waiting application process, and the application process can then proceed past the deadlock point.

If a consistent global checkpoint cannot be found with the first identified checkpoints, then the process is repeated by identifying another resource manager process checkpoint and another volatile checkpoint of an application process waiting for the resource managed by the resource manager process. The process is repeated until a consistent global checkpoint is found or until it is determined that such a consistent global checkpoint cannot be found. If such a consistent global checkpoint cannot be found, an arbitrary resource manager process which manages a resource involved in the deadlock is chosen and is rolled back to a checkpoint such that the resource managed by the resource manager process is reclaimed by the system. Such a rollback is performed with the expectation that the rollback will introduce enough nondeterminisim into the system such that the same deadlock will not occur again.

These and other advantages of the invention will be apparent to those of ordinary skill in the art by reference to the following detailed description and the accompanying drawings.

BRIEF DESCRIPTION OF THE DRAWINGS

FIG. 1 shows an example checkpoint and communication pattern of a multiprocess computer system.

FIG. 2 shows an exemplary wait-for-graph representing the resource allocation state of a multiprocess computer system.

FIGS. 3A and 3B, taken together, show a flow diagram of the deadlock recovery method in accordance with the principles of the present invention.

DETAILED DESCRIPTION

Figure 3B:
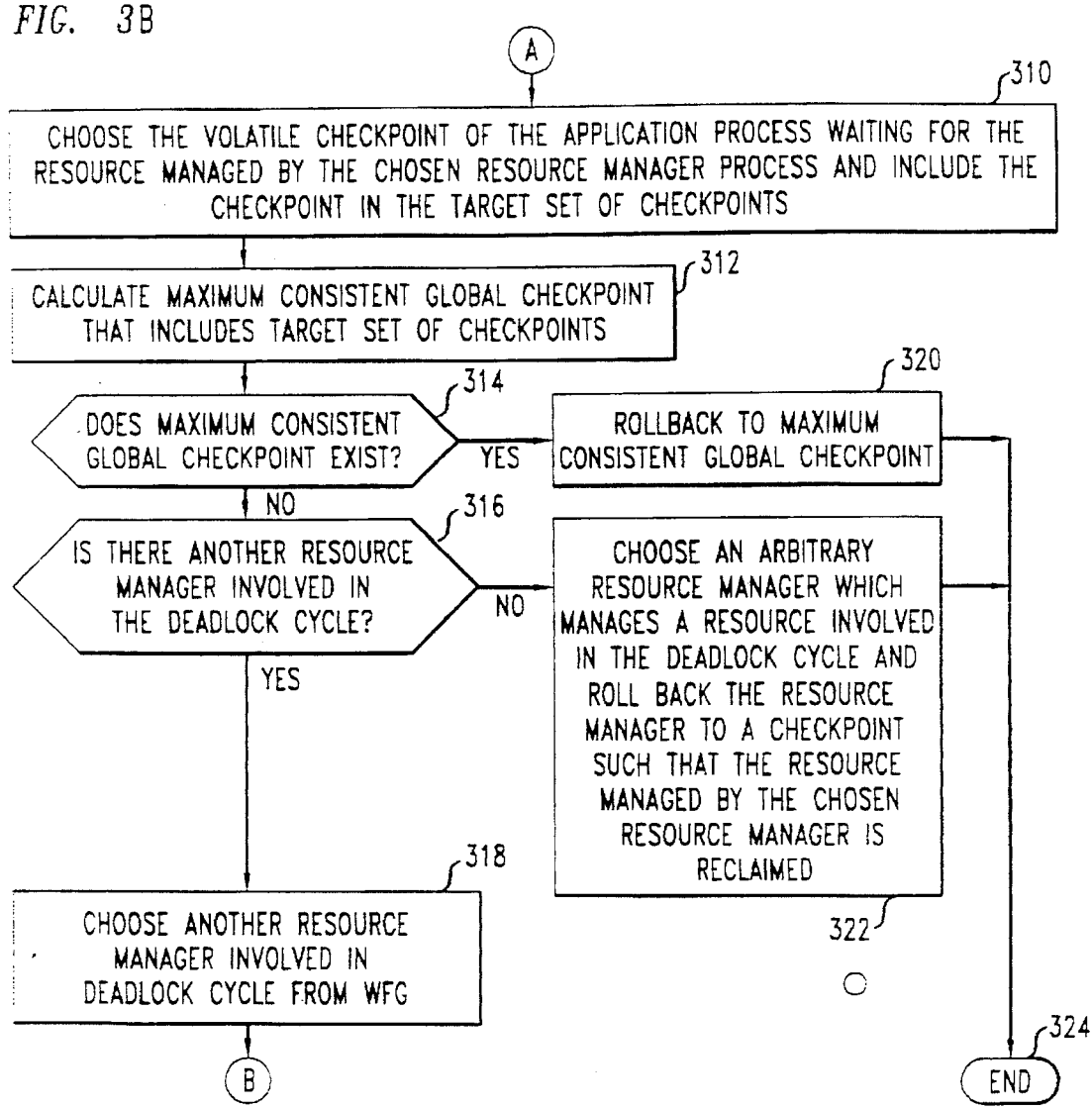

FIG. 1 shows an example checkpoint and communication pattern of a multiprocess computer system executing two application processes P1 and P2, and two resource manager processes M1 and M2. As used herein, the term application process is used when referring to a process which performs some function related to an application being executed by the system. Such application processes request, use, and release shared system resources. The term resource manager process is used when referring to a process which controls the access to the shared resources. As described in more detail in the parent of the present application, a checkpoint and communication pattern represents the execution of processes and the communication between the processes over time. The execution of each of the processes over time is represented by a horizontal execution line, with the time frame moving forward from left to right. Thus, given any two points on an execution line, the point to the left occurs before the point to the right. Each solid rectangle represents a non-volatile checkpoint and each triangle represents a volatile checkpoint. A non-volatile checkpoint is one which is stored on a non-volatile storage device, such as a disk drive, which will survive a process failure. A volatile checkpoint contains the volatile state of a process at a particular instant and is stored in volatile memory. In the present embodiment, the volatile checkpoint will generally contain the state of a process at the time of deadlock detection. Thus, when a deadlock is detected, the further processing of the processes may be suspended. In such a situation, the state of a process at the time of suspension is the state contained in the process's volatile checkpoint.

In addition to representing checkpoints, the checkpoint and communication pattern also represents communications between processes. A directed line from the execution line of one process to the execution line of another process indicates a communication between one process and another. In the present embodiment, there are four types of inter-process communication. A normal inter-process communication message, which is dependent on the application of the computer system, is denoted as m, and is passed from one application process to another. For example, line 102 represents message m being sent from application process P1 to application process P2. A request message is a resource related message passed from an application process to a resource manager process in which the application process requests access to the resource managed by the resource manager process. For purposes of the present description, it is assumed that each resource manager manages one resource, and that resource manager MX manages resource RX. Thus, in the present example, resource manager process M1 manages resource R1, and resource manager process M2 manages resource R2. For example, line 104 represents a request from application process P1 to resource manager process M1 for access to resource R1. A grant message is a resource related message passed from a resource manager process to an application process in which the resource manager process grants access to the resource it manages to the application process. For example, line 106 represents a grant of resource R1 to application process P1. A release message (not shown in FIG. 1) is a resource related message passed from an application process to a resource manager process releasing access to the resource managed by the resource manager process.

An example of a deadlock cycle is now described in conjunction with the checkpoint and communication pattern of FIG. 1. Application process P1 sends a request message 104 to resource manager process M1, requesting access to resource R1. M1 grants P1 the exclusive access to resource R1 with grant message 106. Similarly, application process P2 sends a request message 108 to resource manager process M2 requesting access to resource P2 and M2 grants P2 the exclusive access to resource R2 with grant message 110. During further processing, application process P1 sends an inter-process communication message 102 to application process P2. Next, application process P2 sends request message 112 to resource manager process M1 requesting access to resource R1, and application process P1 sends request message 114 to resource manager process M2 requesting access to resource R2. At this point, the system has entered a deadlock state because application process P1 is holding R1 and waiting for R2, and application process P2 is holding R2 and waiting for R1. Neither P1 nor P2 can progress until it gains access to the resource held by the other process.

In accordance with the present invention, it has been realized that, as a result of rollback propagation, prior deadlock recovery mechanisms which randomly select a victim (i.e. application process to terminate) may result in the same deadlock occurring, as follows. Assume that the deadlock recovery mechanism decides to reclaim R1 from P1 and to grant R1 to P2 instead, in the hopes that P2 will finish processing and release R1 and R2, thereby ending the deadlock. This would require that resource manager process M1 be rolled back to checkpoint 120 such that the grant 106 is rescinded from process P1. If the grant 106 is unsent, then application process P1 must rollback to checkpoint 116 in order to unreceive grant 106. If P1 rolls back to checkpoint 116, it must unsend message 102 and request 114. As a result of unsending message 102, process P2 must unreceive message 102 and must roll back to checkpoint 118. As a result of P1 unsending request 114, process M2 must roll back to checkpoint 122 to unreceive request 114. Thus, rollback propagation due to message dependencies results in processes P1, M1, M2, and P2 rolling back to checkpoints 116, 120, 122 and 118, respectively.

The initial rollback of resource manager process M1 to checkpoint 120, which resulted in the above described rollback propagation, was made in order to reclaim resource R1 so that it could be granted to process P2. However, due to roll back propagation, process P2 was rolled back to checkpoint 118 and its request 112 for resource R1 was unsent. Thus, when the system is restarted, P1's request 104 for resource R1 is the only outstanding request for resource R1, and the system is likely to grant resource R1 to process P1, which will likely result in the same deadlock cycle.

Thus, in accordance with the principles of the present invention, the above problem is solved by taking inter-process rollback dependency into account when selecting the appropriate resource to reclaim. The method according to the present invention is as follows.

It is assumed that a central monitoring process monitors the system and can detect when a deadlock occurs. Such central deadlock detection monitors are well known, and will not be described in detail herein. For further information on deadlock detection monitors, see A. S. Tanenbaum, *Modern Operating Systems*, Englewood Cliffs, N.J., Prentice Hall, 1992, pages 240–248, which is incorporated herein by reference. In the present embodiment, the central monitor maintains a wait-for-graph (WFG) in memory. A WFG is a structure which contains information indicating which application processes are waiting for which resources, and which resource manager processes are waiting for which application processes to release their resources. WFG's are well known. For further information on WFG's, see E. Knapp, "Deadlock Detection in Distributed Databases", *ACM Computing Surveys*, Vol. 19, No. 4, pp. 303–328, December, 1987, which is incorporated herein by reference.

The WFG representing the resource allocation state of the system at time point 130 (at the time of the deadlock detection) in the checkpoint and communication pattern of FIG. 1, is shown in FIG. 2. In a WFG, application processes are represented by circles and resource manager processes are represented by squares. The directed edges of a WFG are created as follows:

1. When an application process sends a request to a resource manager for a resource, and the resource manager process cannot satisfy the request for the resource, an edge is drawn from the application process to the resource manager process;

2. When a resource manager process grants a resource to a requesting application process, an edge is drawn from the resource manager process to the application process and the existing edge from the application process to the resource manager process is removed.

3. When an application process releases a resource (i.e. sends a release message to a resource manager process), the existing edge from the resource manager process to the application process is removed.

Thus, the WFG graph of FIG. 2 is interpreted as follows. Edge 202 indicates that application process P1 is waiting for resource R2 from resource manager process M2. Edge 204 indicates that resource manager process M2 is waiting for application process P2 to release resource R2. Edge 206 indicates that application process P2 is waiting for resource R1 from resource manager process M1. Edge 208 indicates that resource manager process M1 is waiting for application process P1 to release resource R1. From this WFG, it can be determined that the system is in a deadlock state. Deadlock detection using a WFG is well known and is described in A. S. Tanenbaum, *Modern Operating Systems*, Englewood Cliffs, N.J., Prentice Hall, 1992, pages 240–248, which is incorporated herein by reference.

When it is determined that a deadlock has occurred, it is desirable to choose a resource to reclaim that will not result in the system entering the same deadlock cycle again when the system is restarted after rollback. Thus, it is desirable to perform system rollback such that at least one of the processes involved in the deadlock cycle will execute beyond the point of deadlock after the rollback. In an advantageous embodiment, this is accomplished by identifying a resource that can be reclaimed and given to a non-rolled-back process. More particularly, it is desirable to roll back a resource manager process to unsend its most recent resource grant message without rolling back the application process to which the reclaimed resource is supposed to be granted. An algorithm for accomplishing this is described below in conjunction with the flow diagram of FIGS. 3A and 3B.

Figure 4:
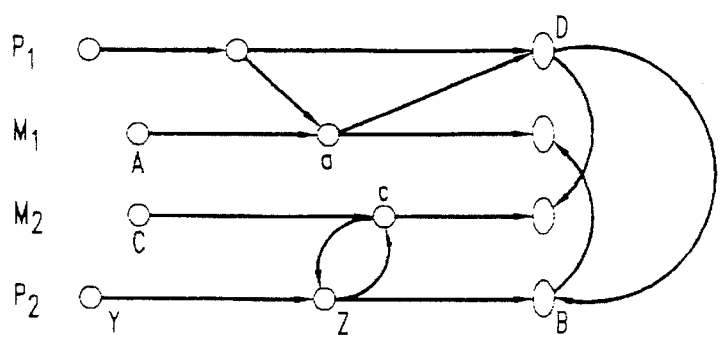
FIG. 4 shows a rollback dependency graph for the checkpoint and communication pattern of FIG. 1.

In step 300, deadlock is detected by the monitor process. In step 306 a data structure which represents a rollback dependency graph (R-graph) is created and stored in computer memory. An R-graph represents the checkpoint and communication pattern of a multiprocess computer system. The R-graph for the checkpoint and communication pattern of FIG. 1 is shown in FIG. 4. The details of creating an R-graph are described in the parent of the present application, and will not be repeated herein. Briefly, each node in the R-graph represents a checkpoint, with circular nodes representing non-volatile checkpoints and oval nodes representing volatile checkpoints. A directed edge between nodes indicates a rollback dependency relationship between checkpoints represented by the nodes.

In step 302 a resource manager which is involved in the deadlock cycle is chosen from the WFG. In the current example, assume that resource manager process M1 is chosen in step 302. In step 304 the application process within the deadlock cycle which is waiting for the resource managed by the chosen resource manager process is determined. In the example, process P2 is waiting for resource R1 as indicated by edge 206 of the WFG.

In step 308 the most recent checkpoint of the chosen resource manager process that will reclaim the resource managed by the resource manager process is chosen, and the chosen checkpoint is included in a target set of checkpoints. The use of the target set of checkpoints will be described in further detail below. In the example, M1 is the chosen resource manager process, and as shown in the checkpoint and communication pattern of FIG. 1, checkpoint 120 is the most recent checkpoint of M1 that will reclaim resource R1, by unsending grant 106. Thus, checkpoint 120 is included in the target set of checkpoints. In step 310 the volatile checkpoint of the application process waiting for the resource managed by the chosen resource manager process is chosen, and the checkpoint is included in the target set of checkpoints. In the example, application process P2 is waiting for resource R1 as determined in step 304, and volatile checkpoint 124 is included in the target set of checkpoints.

In step 312, the maximum consistent global checkpoint including the target set of checkpoints is calculated. A maximum consistent global checkpoint is the most recent (i.e. closest to time of deadlock occurrence) consistent global checkpoint which contains the target set of checkpoints. The detailed method for calculating the maximum consistent global checkpoint is described in conjunction with FIG. 7 of the parent of the present application, and such details will not be repeated herein. In step 314 it is determined whether a maximum consistent global checkpoint containing the target set exists. In the present example, a maximum consistent global checkpoint containing the given target set of checkpoints does not exist, and it is determined in step 316 whether there is another resource manager process involved in the deadlock cycle. With reference to the WFG of FIG. 2, it is determined that M2 exists in the present example and control passes to step 318. M2 is chosen in step 318 and control passes to step 304. In step 304, it is determined that process P1 is waiting for resource R2 based on edge 202 of the WFG. In step 308 checkpoint 126 is chosen for the target set since it is the most recent checkpoint that will reclaim resource R2 by unsending grant 110. In step 310 checkpoint 128 is chosen for the target set since it is the volatile checkpoint of application process P1. In step 312, the maximum consistent global checkpoint containing checkpoints 126 and 128 is calculated in accordance with the method described in the parent of the present application. During this iteration, the maximum consistent global checkpoint can be calculated, and it contains the checkpoints 128, 132, 126, and 134. Thus, processes P1, M1, M2, and P2 will be rolled back to checkpoints 128, 132, 126, and 134, respectively in step 320. It is noted that checkpoint 128 is a volatile checkpoint. As described above, a volatile checkpoint contains the state of a process at a particular instant. In the present example, the volatile checkpoint 128 contains the state of application process P1 at the time 130 that deadlock was detected. Therefore, application process P1 is not rolled back prior to the point 130 where deadlock was detected. The deadlock recovery ends in step 324.

If it is determined in step 316 that there are no more resource manager processes in the deadlock cycle, then in step 322 an arbitrary resource manager process which manages a resource involved in the deadlock is chosen and is rolled back to a checkpoint such that the resource managed by the chosen resource manager process is reclaimed by the system. Such a rollback is performed with the expectation that the rollback will introduce enough nondeterminism into the system such that the same deadlock will not occur again. The deadlock recovery ends in step 324.

Thus, in accordance with the present invention, when resource manager process M2 rolls back to checkpoint 126, it unsends the grant 110 of resource R2 to application process P2. However, application process P1, which is waiting for resource R2, is not rolled back past the deadlock detection point 130, and therefore when the system is restarted, application process P1's request 114 for resource R2 is still pending. Thus, application process P1 could be granted resource R2 immediately upon system restart, and application process P1 can progress past point 130, thus breaking the deadlock cycle.

The foregoing Detailed Description is to be understood as being in every respect illustrative and exemplary, but not restrictive. It is to be understood that the embodiments shown and described herein are only illustrative of the principles of the present invention and that various modifications may be implemented by those skilled in the art without departing from the scope and spirit of the invention. For example, the embodiment described herein describes resource manager processes which manage a single resource. However, one skilled in the art would recognize that the principles of the present invention could be applied to systems which employ resource managers which manage more than one resource.

We claim:

1. A method for operation of a shared resource computer system, said computer system executing at least two processes performing inter-process communication and periodic local checkpoints, said inter-process communication and periodic local checkpoints defining a checkpoint and communication pattern, the method comprising the steps of:
    monitoring said computer system to determine if it has entered a deadlock state;
    upon determination that said computer system has entered a deadlock state:
        analyzing said checkpoint and communication pattern to determine inter-process rollback dependency;
        choosing a resource to reclaim based on said inter-process rollback dependency; and
        reclaiming said chosen resource.

2. The method of claim 1 further comprising the step of:
    providing the reclaimed resource to a process waiting for the resource.

3. The method of claim 1 wherein each of said resources is managed by an associated resource manager process, said step of reclaiming said resource further comprising the step of:

rolling back a resource manager process associated with said reclaimed resource to a checkpoint prior to the point where said resource manager process granted access to the resource.

4. The method of claim 1 wherein said computer system is executing a plurality of processes in addition to said at least two processes, wherein said plurality of processes perform inter-process communication and periodic local checkpoints.

5. The method of claim 1 wherein said step of analyzing said checkpoint and communication pattern to determine inter-process rollback dependency further comprises the step of:

creating a rollback dependency graph representing said checkpoint and communication pattern.

6. The method of claim 1 wherein said step of monitoring said system to determine if it has entered a deadlock state further comprises the steps of:

maintaining a wait-for-graph in a memory of said computer system; and analyzing said wait-for-graph to identify a deadlock cycle.

7. A method for operation of a computer system in which resources are shared among application processes and in which said resources are managed by resource manager processes, the method comprising the steps of:

monitoring said system to determine if it has entered a deadlock state;

upon determination that said system has entered a deadlock state:
 a) identifying a checkpoint of a resource manager process that, if rolled back to, would reclaim a resource involved in the deadlock;
 b) identifying a volatile checkpoint of an application process waiting for said resource;
 c) calculating a consistent global checkpoint including said checkpoint of said resource manage process and said volatile checkpoint of said application process; and
 d) rolling back said computer system to said consistent global checkpoint.

8. The method of claim 7 wherein said step of monitoring said system to determine if it has entered a deadlock state further comprises the steps of:

maintaining a wait-for-graph in a memory of said computer system; and analyzing said wait-for-graph to identify a deadlock cycle.

9. The method of claim 7 wherein said consistent global checkpoint is a maximum consistent global checkpoint.

10. The method of claim 7 wherein said checkpoint of said resource manager is the most recent checkpoint of said resource manager which will unsend a grant message granting said resource to an application process.

11. A method for operation of a computer system in which resources are shared among application processes and in which said resources are managed by resource manager processes, the method comprising the steps of:

monitoring said computer system to determine if it has entered a deadlock state;

upon determination that said computer system has entered a deadlock state:
 a) identifying a checkpoint of a resource manager process that, if rolled back to, would reclaim a resource involved in the deadlock;
 b) identifying a volatile checkpoint of an application process waiting for said resource;
 c) determining if a consistent global checkpoint including said checkpoint of said resource manage process and said volatile checkpoint of said application process exists;
 d) repeating steps a) through c) until it is determined that a consistent global checkpoint exists or that a consistent global checkpoint does not exist; and
 e) if a consistent global checkpoint exists, rolling back said computer system to said consistent global checkpoint.

12. The method of claim 11 further comprising the steps of:

if a consistent global checkpoint does not exist:
 arbitrarily identifying a checkpoint of a resource manager process that, if rolled back to, would reclaim a resource involved in the deadlock;
 determining a consistent global checkpoint including said arbitrarily identified checkpoint; and
 rolling back said computer system to said consistent global checkpoint.

13. The method of claim 11 wherein said checkpoint of said resource manager is the most recent checkpoint of said resource manager which will unsend a grant message granting said resource to an application process.

14. The method of claim 11 wherein said consistent global checkpoint is a maximum consistent global checkpoint.

15. The method of claim 11 wherein said step of monitoring said system to determine if it has entered a deadlock state further comprises the steps of:

maintaining a wait-for-graph in a memory of said computer system; and analyzing said wait-for-graph to identify a deadlock cycle.

* * * * *